(12) United States Patent
Nechitailo

(10) Patent No.: US 6,749,446 B2
(45) Date of Patent: Jun. 15, 2004

(54) OPTICAL FIBER CABLE WITH CUSHION MEMBERS PROTECTING OPTICAL FIBER RIBBON STACK

(75) Inventor: Nicholas Nechitailo, Conover, NC (US)

(73) Assignee: Alcatel, Paris (FR)

( * ) Notice: Subject to any disclaimer, the term of this patent is extended or adjusted under 35 U.S.C. 154(b) by 167 days.

(21) Appl. No.: 09/972,902

(22) Filed: Oct. 10, 2001

(65) Prior Publication Data
US 2003/0068147 A1 Apr. 10, 2003

(51) Int. Cl.[7] ............. G02B 6/44; G02B 6/00
(52) U.S. Cl. ............. 439/114; 385/102; 385/147
(58) Field of Search ............. 385/114, 102, 385/147

(56) References Cited

U.S. PATENT DOCUMENTS

| | | |
|---|---|---|
| 3,984,172 A | 10/1976 | Miller |
| 4,078,853 A * | 3/1978 | Kempf et al. ............. 385/114 |
| 4,715,677 A | 12/1987 | Saito et al. |
| 4,770,489 A | 9/1988 | Saito et al. |
| 4,820,014 A | 4/1989 | Nishimura et al. |
| 4,852,965 A * | 8/1989 | Mullin et al. ............. 385/101 |
| 4,971,419 A * | 11/1990 | Gartside et al. ............. 385/106 |
| 4,997,257 A | 3/1991 | Spedding |
| 5,050,959 A | 9/1991 | Randisi |
| 5,229,851 A | 7/1993 | Rahman |
| 5,243,675 A | 9/1993 | Kathiresan et al. |
| 5,517,591 A | 5/1996 | Wagman et al. |
| 5,621,842 A | 4/1997 | Keller |
| 5,651,082 A | 7/1997 | Eoll |
| 5,657,413 A | 8/1997 | Ray et al. |
| 5,698,615 A | 12/1997 | Polle |
| 5,845,032 A | 12/1998 | Konda et al. |
| 6,052,502 A | 4/2000 | Coleman |
| 6,284,367 B1 | 9/2001 | Gruhn et al. |

FOREIGN PATENT DOCUMENTS

| | | |
|---|---|---|
| EP | 0 676 654 A2 | 10/1995 |
| EP | 1 085 356 A2 | 3/2001 |

* cited by examiner

*Primary Examiner*—Chandrika Prasad
(74) *Attorney, Agent, or Firm*—Sughrue Mion, PLLC

(57) ABSTRACT

An optical fiber cable includes an optical fiber ribbon stack having a plurality of optical fibers, and at least one cushion member disposed on outer side surfaces of the optical fiber ribbon stack. The cushion member functions as a spacer and strain energy absorbing member for protecting corner fibers of the optical fiber ribbon stack from bending and contact stresses due to contact with a buffer tube or other surrounding elements. The cushion member may have material characteristics, such as contact hardness and Young's modulus, which are similar to those of the ribbon stack, or which gradually change from a soft inner layer at the side of the cushion member which contacts the ribbon stack to a stiff outer layer at the side of the cushion member which may contact a buffer tube or other surrounding elements. An elastic membrane surrounds the optical fiber ribbon stack and attached cushion member, and a filler material, such as bubbled foam or foamed gel, is disposed in the space between the ribbon stack and the elastic membrane and the space between the elastic membrane and the buffer tube.

29 Claims, 4 Drawing Sheets

OPTICAL FIBER CABLE WITH CUSHION MEMBERS PROTECTING OPTICAL FIBER RIBBON STACK

FIELD OF THE INVENTION

The present invention relates to an optical fiber cable including an optical fiber ribbon stack. In particular, the present invention relates to an optical fiber cable including an optical fiber ribbon stack and cushion members disposed on sides of the optical fiber ribbon stack for protecting corner fibers of the optical fiber ribbon stack from excessive bending and contact stresses.

BACKGROUND OF THE INVENTION

Optical fiber cables are used to transmit information at very high rates over long distances. Buffer tubes are typically utilized in optical fiber cables as the primary structure for protecting the optical fiber units contained within. In particular, the buffer tubes typically house an optical unit such as one or more loose optical fibers or an optical fiber ribbon stack having a plurality of optical fibers held together in a planar array by a common matrix material.

In a loose tube cable structure, a plurality of buffer tubes, each housing one or more loose optical fibers or an optical fiber ribbon stack, are stranded around a central strength member to form a stranded core which is jacketed with an additional protective layer. In a monotube cable structure, a plurality of optical fibers or an optical fiber ribbon stack are housed in a single, centrally located buffer tube which is jacketed with an additional protective layer. Further, reinforcing yarns or fibers as well as water blocking materials in the form of gels or hot melts, water swellable powders, yarns or tapes, and/or corrugated armor may be utilized between the jacket and the buffer tubes.

In a slotted core cable, optical fiber ribbon stacks are disposed in slots or grooves formed in an exterior surface of a central elongate rod-like member. Alternatively, the optical fiber ribbon stacks may be housed in buffer tubes which are disposed in the slots. In either case, the optical fiber ribbon stacks or buffer tubes housing the optical fiber ribbon stacks are held in the slots by outer sheath or binding tape which surrounds the slotted rod-like member.

The buffer tubes housing the optical fibers may be left empty or may be filled with a water blocking compound such as a thixotropic gel which prevents water ingress but allows for fiber movement during cable expansion or contraction or under mechanical loads. It is also known to use water swellable or superabsorbent materials, in the form of tape, powder or yarn, which absorb water.

A problem in the design of optical cables employing ribbon stacks is attenuation in corner fibers of the ribbon stacks which may reduce overall performance characteristics of the cables and place limitations on the level of recommended thermo-mechanical loads. As shown in FIG. 1, the corner fibers 15 of a ribbon stack 10 are located furthest from the geometrical center 14 of the fiber ribbon stack 10. Consequently, the corner fibers 15 are subjected to maximum stresses under bending conditions and contact stresses from surrounding components such as a buffer tube 20 housing the ribbon stack 10 and an outer jacket (not shown) surrounding the buffer tube 20, in central tube single-ribbon configurations. That is, in the case of bending with respect to the shown bending axis A, the corner fibers 15 are subjected to maximum stresses resulting in fiber deformation and consequently, attenuation of the corner fibers 15. It is believed that attenuation is caused by the reduction in the radius of the fiber curvature.

One of the criterion utilized to predict performance of an optical fiber cable is the stress state of the corner fibers. Another criterion is the tensile and compressive windows showing how much displacement under tension and thermal contraction is allowed for the fibers inside the buffer tube before the fiber hits the buffer tube wall. In particular, design for cables including ribbon stacks is commonly focused on providing a sufficiently large gap or separation distance between the corners of the fiber stack and other structural members such as the wall of the buffer tube in order to avoid or delay contact and bending of the corner fibers which lead to the attenuation problems. Therefore, in conventional cable designs which attempt to prevent possible attenuation problems, the diameter of the buffer tube containing the ribbon stacks may be increased resulting in an undesirable increase in the overall cable diameter.

In view of the disadvantages and problems associated with housing ribbon stacks in buffer tubes, it is an object of the present invention to provide an optical cable wherein the corner fibers of a ribbon stack are protected from excessive stresses in order to improve overall performance and load carrying capacity.

SUMMARY OF THE INVENTION

The present invention is adapted to achieve the foregoing objects. In accomplishing these objects, the present invention provides an optical fiber cable comprising an optical fiber ribbon stack including a plurality of optical fibers, and a plurality of cushion members disposed on outer side surfaces of the optical fiber ribbon stack. The cushion members function as spacers and strain energy absorbing members for protecting corner fibers of the optical fiber ribbon stack from bending and contact stresses.

The cushion members have material characteristics, such as contact hardness and Young's modulus, which are similar to those of the ribbon stack, in particular, ribbon matrix. Further, the material characteristics of the cushion members may be graded or gradually change from a soft inner layer at the sides of the cushion members which contact the ribbon stack to a stiff outer layer at the sides of the cushion which may contact the buffer tube or other surrounding elements. When the cushion members contact the sides of the buffer tube under crushing and transverse impact loading conditions, the cushion members are deformed thereby effectively absorbing strains and stresses and protecting the corner fibers of the ribbon stack.

According to the present invention, there is further provided an elastic membrane surrounding the optical fiber ribbon stack and attached cushion members, and a filler material disposed in the space between the ribbon stack and the elastic membrane and the space between the elastic membrane and the buffer tube. The filler material may include a soft polymer, as well as bubbled foam or foamed gel with or without reused materials such as chips or powder of a low-density polyethylene and other non-metals and metals. The elastic membrane and the filler material provide a surface for permitting the sliding of the components in the longitudinal direction of the optical cable so that less strain energy is transmitted from the buffer tubes to the fibers under thermally induced contraction, longitudinal bending or buckling of fibers.

The above and other features of the invention including various and novel details of construction and process steps will now be more particularly described with reference to the accompanying drawings and pointed out in the claims. It will be understood that the particular optical cable structure embodying the invention is shown by way of illustration only and not as a limitation of the invention. The principles and features of this invention may be employed in varied and numerous embodiments without departing from the scope of the invention.

BRIEF DESCRIPTION OF THE DRAWINGS

These and other features, aspects and advantages of the present invention will become better understood with reference to the following detailed description, appended claims, and accompanying drawings, wherein:

DESCRIPTION OF THE PREFERRED EMBODIMENTS

Figure 1:
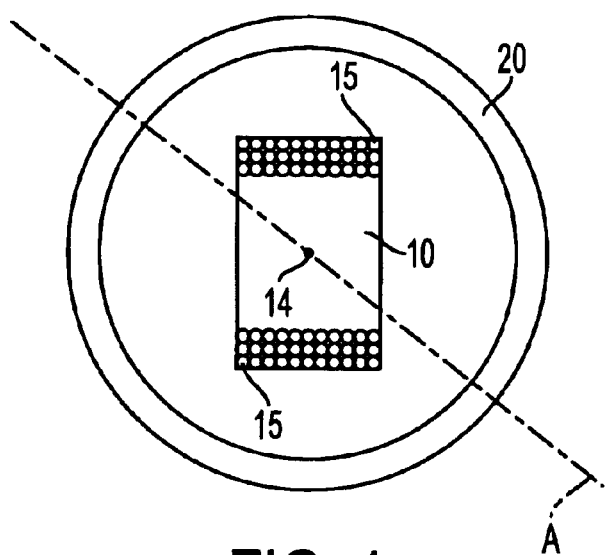
FIG. 1 illustrates a sectional view of a conventional optical fiber cable wherein a ribbon stack is housed in buffer tube.
Figure 2:
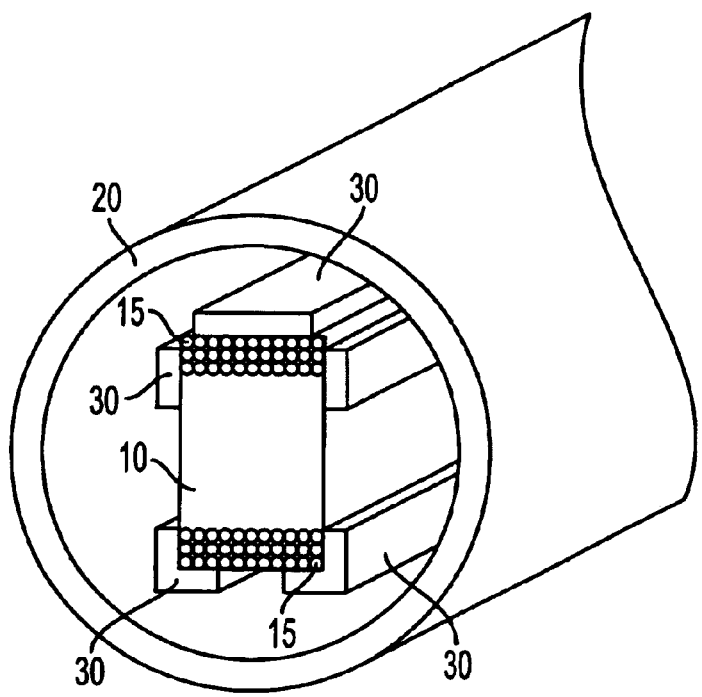
FIG. 2 illustrates a perspective view of an optical fiber cable structure in accordance with the first embodiment of the present invention.
Figure 3A:
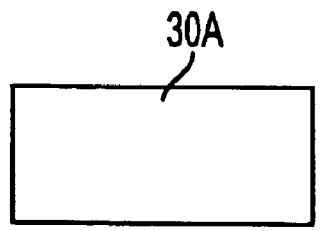
FIGS. 3A–3D illustrate a partial sectional views of an optical fiber cable structure in accordance with the first embodiment of the present invention
Figure 3B:
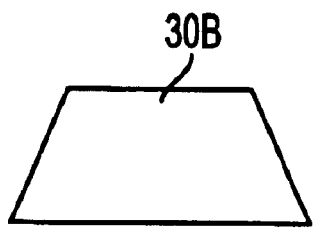
Figure 3C:
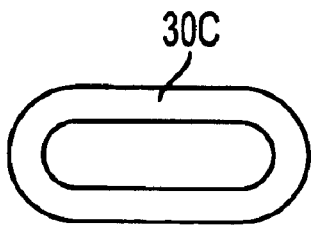
Figure 3D:
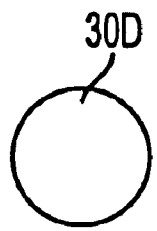

Hereinafter, the preferred embodiments of the present invention will be described in greater detail with reference to the attached drawings. Referring to FIG. 2, the optical fiber cable includes an optical fiber ribbon stack 10 surrounded by a buffer tube 20. A plurality of cushion members 30, in the form of elongated strips, threads, rods or small-diameter tubes, are attached to the sides of the ribbon stack 10 at locations near or overtop the corner edges of the ribbon stack 10. The cushion members serve as spacers and strain energy absorbing members which protect corner fibers 15 located at the edges of the ribbon stack 10 from bending and contact stresses.

The material characteristics at an outer surface portion of the cushion members 30, such as contact hardness and Young's modulus or stiffness, are similar to the material characteristics of the matrix material of the ribbon stack 10, e.g., Young's modulus of 30 to 1000 kg/mm². Alternatively, the cushion members 30 may have a composite structure formed of multiple laminated layers so that the material characteristics of the cushion members 30 may be graded or gradually change from a soft inner layer at the sides of the cushion members 30 which contact the ribbon stack 10 to a stiff outer layer at the sides of the cushion members 30 which may contact the buffer tube 20 or other surrounding elements. For example, outer layer of the cushion members 30 facing the inner wall of the buffer tube 20 may have Young's modulus of about 200 to 300 kg/mm². In other words, the material characteristics of the cushion members 30 gradually change across the width of the cushion members 30.

Under thermo-mechanical loading conditions, the corner fibers 15 press first against the cushion members 30 which are softer than or the same stiffness as the ribbon stack 10. Since the corner fibers 15 do not initially contact the buffer tube wall, the cushion members 30 first act as continuation of the fiber-friendly matrix material of the ribbon stack 10. Next, when the cushion members 30 contact the buffer tube wall, the cushion members are subjected to further deflection and compression with gradually increasing stiffness. As a result, the cushion members 30 function as a spring or a shock absorber, wherein the resistance increases with the applied load.

As shown in FIG. 2, the cushion members 30 may be attached to the sides of the ribbon stack 10 at locations next to the edges of the ribbon stack 10, over the edges of the ribbon stack 10, and/or centered at the midpoint point of the sides of the ribbon stack 10. Centering the cushion members 30 in the middle of the sides of the ribbon stack 10 provides the additional advantages of not increasing the overall diameter of the optical cable and providing structural stability to the ribbon stack 10. In particular, in the case of the ribbon stack 10 having a cross-sectional rectangular shape, the centering of the cushion members 30 on the sides of the ribbon stack 10 provides additional structural stability by holding together the individual ribbons which form the ribbon stack 10.

In addition, the cushion members 30 may be twisted together with the ribbon stack 10 to improve structural stability of the ribbon stack 10 (especially in the case of a cable having high number of ribbons per stack) and overall strength and robustness of the optical cable. In particular, the ribbon stack 10 may be twisted and the cushions members 30 may be twisted with the same twist laylength to follow the stack path and to keep the same position with respect to the cross section of the ribbon stack 10.

As shown in FIGS. 3A–3D, the cushion members 30 may have different cross-sectional shape configurations such as, for example, a rectangular shape 3A, a trapezoidal shape 3B, a hollow tube shape 3C, and circular or oval shape 3D. In the preferred embodiment, the cross section of the cushion members 30 have a trapezoidal shape 36. On the other hand, the hollow tube shape 32 provides an additional cushioning benefit due to the radial or transversal flexibility. Further, solid circular or oval rods 38 and rectangular tapes 34 are easier to manufacture than the other shapes thereby reducing associated manufacturing costs.

Figure 4:
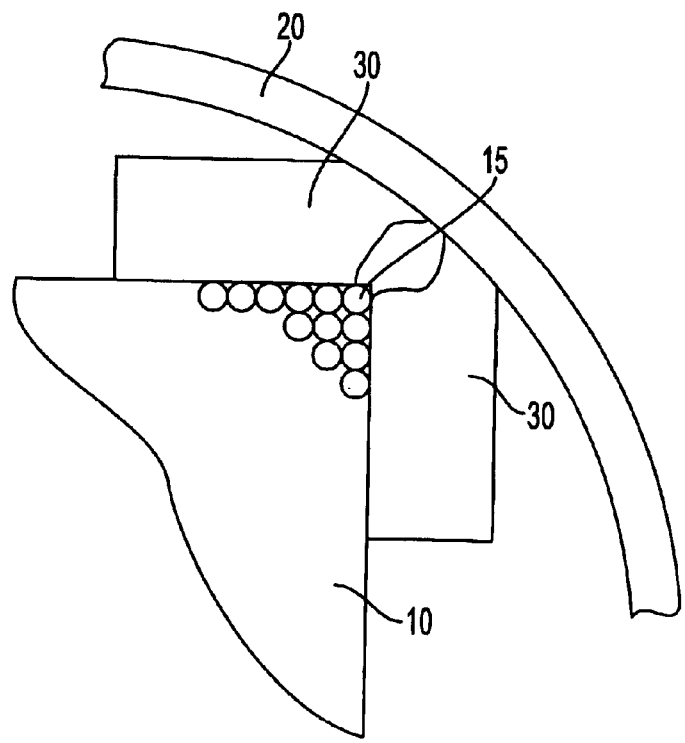
FIG. 4 illustrates a sectional view of an optical fiber cable structure in accordance with a second embodiment of the present invention.

When the cushion members 30 contact the sides of the buffer tube 20 under crushing and transverse impact loading conditions, the cushion members 30 are deformed thereby effectively absorbing strains and stresses and protecting the corner fibers 15 of the ribbon stack 10. It follows that the deformation of the cushion members 30 on the sides of the ribbon stack 10 under the action of external thermo-mechanical loads will depend on the shape of the cushion cross-section. Further, by positioning the cushion members 30 near the edges of the ribbon stack 10, an arch-like protective structure may be formed above the corners when neighboring cushion members 30 located on perpendicular sides of the ribbon stack 10 deform due to contact with the buffer tube 20, as shown in FIG. 4.

Figure 5:
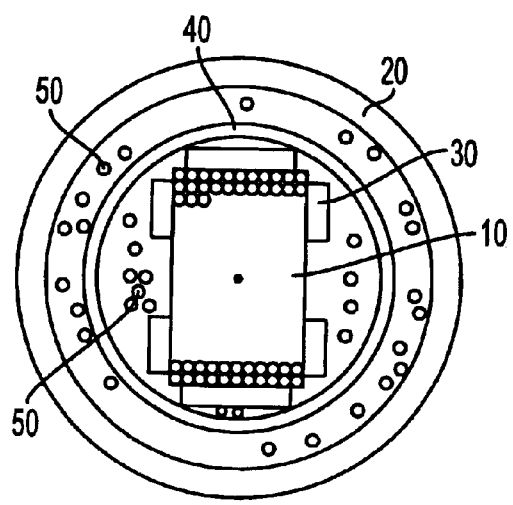
FIG. 5 illustrates a loose tube cable embodying the present invention.

A second embodiment of the present invention will now be described with reference to FIG. 5. The optical fiber ribbon stack 10 with attached cushion members 30 is surrounded by a thin elastic membrane 40. A filler material 50, such as a bubbled foam or foamed gel, is provided in the space between the ribbon stack 10 with attached cushion members 30 and the elastic membrane 40 and in the space between the elastic membrane 40 and the buffer tube 20.

The elastic membrane 40 is formed of a flexible rubber-like elastomer material such as polyurethane, silicone, styrene-butadiene-rubber, natural rubber (polyisoprene), and acrylonitrile-butadiene-styrene (ABS). The elastic membrane 40 serves to hold the cushion members 30 and the ribbon stack 10 and to accommodate a portion of stresses caused by bending, thermal shrinking and contraction. In particular, the elastic membrane 40 imposes radial compression on the cushion members 30 and the ribbon stack 10 so that the cushion members 30 will be slightly compressed against the ribbon stack 10. As a result, the elastic membrane 40 provides additional stack integrity or stack stability, especially for tall ribbon stacks. The elastic membrane 40 is filled with the filler material 50 to increase sliding with respect to shrinkage and expansion of the outer jacket and to smooth stress distribution. In particular, the elastic membrane 40, aided by the filler material 50, provides a surface for permitting the sliding of the components in the longitudinal direction of the optical cable. As a result, less strain energy will be transmitted from deforming buffer tube 20 to the optical fibers of the ribbon stack 10 under thermally induced shrinkage or bending.

The elastic membrane 40 may be manufactured as a second inner buffer tube. For example, a very thin thermoplastic (or rubber-like) tube may be extruded over the ribbon stack 10 with attached cushion members 30 and the space between the thin-walled tube (i.e., the elastic membrane 40) and the ribbon stack 10 may be filled with the filler material 50. Next, a buffer tube 20 may be extruded around the thin-walled tube and space between the buffer tube 20 and the thin-walled tube is filled with a filler material 50.

In the preferred embodiment, the filler material 50 includes a soft polymer, as well as bubbled foam or foamed gel with or without reused materials such as chips or powder of a low-density polyethylene and other non-metals and metals. For example, the filler material can be a gel with small suspended particles. The filler material 50, in the form of bubble foam or foamed gel and other bubbled materials with low yield stress and high compressibility (due to easy-to-compress air bubbles or other soft encapsulated materials), provides additional protection under excessively high load by deforming to absorb the load. In particular, the compressibility of bubbles containing gas or other soft materials contributes to the dissipation of stresses propagating from buffer tube 20 to the fibers of the ribbon stack 10. In this manner, the strain-dissipating properties of the filler material 50 is similar to that of packaging materials such as bubble wrap and styrofoam pieces.

Figure 6:
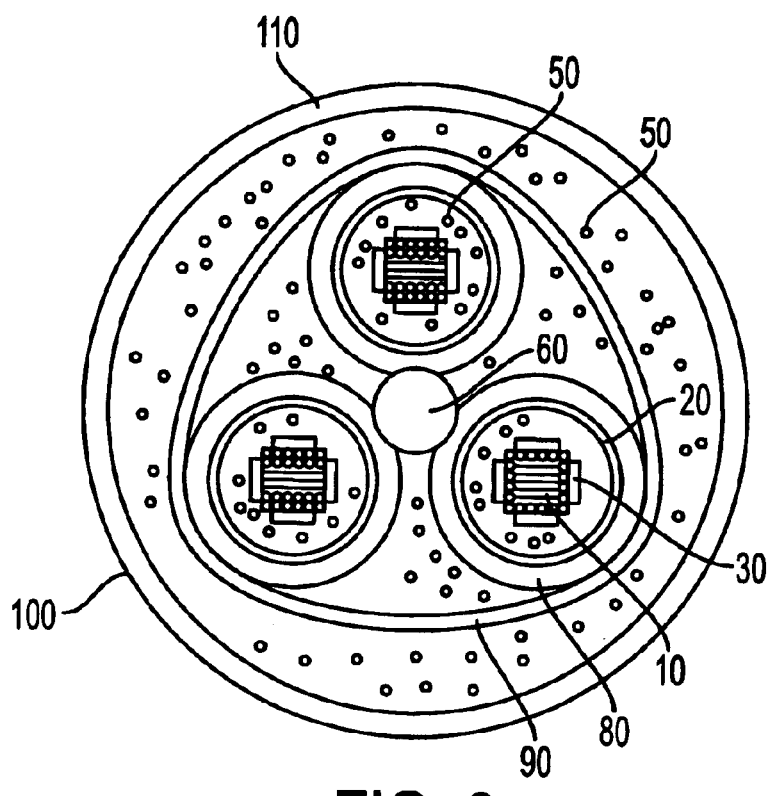
FIG. 6 illustrates a slotted core cable embodying the present invention.

The present invention is not limited to the embodiments shown in FIGS. 2–5. Within the scope of this invention, well-known structural components such as swellable tape, strength members, binder thread wrapped around buffer tubes and other existing components can be integrated with the present invention. As illustrated in FIG. 6, a loose tube cable 100 includes a plurality of buffer tubes 20 stranded around a central strength member 60. A binder 90 is stranded around the buffer tubes 20 and a water-swellable tape 80 is wrapped around each of the buffer tubes 20 in order to reduce contact stresses from expansion and shrinkage of an outer jacket 110. In addition to being utilized within the buffer tubes 20, the filler material 50, such as bubble foam, is used to fill the space between the cable components in order to maintain the round shape of the cable 100.

Although certain preferred embodiments of the present invention have been described, the spirit and scope of the invention is by no means restricted to what is described above. For example, the present invention is clearly applicable to slotted core cables which may or may not include buffer tubes surrounding the ribbon stacks. That is, the ribbon stacks with attached cushion members may be disposed in the grooves or slots of the slotted rod-like core without utilizing a buffer tube. Further, a single tube-like cushion member which completely surrounds and is attached to all sides of the ribbon stack may be utilized rather than a plurality of cushion members individually attached to the sides of the ribbon stack. Accordingly, persons skilled in the art will recognize that many variations of the teachings of this invention can be practiced that still fall within the claims of this invention which follow.

What is claimed is:

1. An optical fiber cable, comprising:
   an optical fiber ribbon stack comprising a plurality of optical fibers held together in a planar array;
   a plurality of cushion members disposed on an outer side surface of the optical fiber ribbon stack; and
   a buffer tube surrounding the cushion members and the optical fiber ribbon stack, wherein the cushion members are disposed parallel to a central longitudinal axis of the optical fiber ribbon stack to prevent corner fibers of the optical fiber ribbon stack from contacting the buffer tube.

2. The optical fiber cable as claimed in claim 1, wherein the cushion members are disposed over corner edges of the ribbon stack.

3. The optical fiber cable as claimed in claim 1, wherein the cushion members are centered on the outer side surfaces of the ribbon stack.

4. The optical fiber cable as claimed in claim 1, wherein the cushion members have an elasticity stiffness which varies across the thickness of the cushion members.

5. The optical fiber cable as claimed in claim 1, wherein the cushion members are disposed along edges of the optical fiber ribbon stack.

6. The optical fiber cable as claimed in claim 1, wherein the optical fibers of the optical fiber ribbon stack are held together by a matrix material, and an outer surface of the cushion members have a contact hardness and a Young's modulus which are approximately the same as a contact hard hardness and a Young's modulus of the matrix material.

7. The optical fiber cable as claimed in claim 1, wherein each cushion member has a graded contact hardness or Young's modulus which changes from a side of the cushion member which contacts the optical fiber ribbon stack to a side of the cushion member which faces away from the optical fiber ribbon stack.

8. The optical fiber cable as claimed in claim 1, wherein each cushion member has a graded Young's modulus or contact hardness which changes from the Young's modulus or contact hardness of the optical fiber ribbon stack towards the Young's modulus and contact hardness of the buffer tube.

9. The optical fiber cable as claimed in claim 1, wherein a contact hardness of each cushion member on a side of the cushion member which contacts the optical fiber ribbon stack is a softer than a contact hardness of the cushion member on a side of the cushion member which faces the buffer tube.

10. The optical fiber cable as claimed in claim 1, wherein the cushion members are centered on the side surfaces of the optical fiber ribbon stack.

11. The optical fiber cable as claimed in claim 1, wherein the cushion members are twisted together with the optical fiber ribbon stack.

12. The optical fiber cable as claimed in claim 1, wherein a cross-sectional shape of each cushion member is a hollow tube, a rectangle, a trapezoid, or a circle.

13. An optical fiber cable, comprising:
- an optical fiber ribbon stack comprising a plurality of optical fibers held together in a planar array;
- a plurality of cushion members disposed on an outer side surface of the optical fiber ribbon stack;
- an elastic membrane surrounding the optical fiber stack and the cushion members;
- a buffer tube surrounding the elastic member; and
- a filler material provided between the optical fiber ribbon stack and the elastic membrane and between the buffer tube and the optical fiber ribbon stack.

14. The optical fiber cable as claimed in claim 13, wherein the cushion members and the elastic membrane prevent corner fibers of the optical fiber ribbon stack from contacting the buffer tube.

15. The optical fiber cable as claimed in claim 13, wherein the elastic membrane imposes radial compression on the cushion members, and the optical fiber ribbon stack so that the cushion members are slightly compressed against the optical fiber ribbon stack.

16. The optical fiber cable as claimed in claim 15, wherein the elastic membrane is formed of a flexible elastomer material.

17. The optical fiber cable as claimed in claim 13, wherein filler material comprises a gel or foam containing a plurality of gaseous bubbles.

18. The optical fiber cable as claimed in claim 13, wherein the filler material comprises be a gel with suspended particles.

19. The optical fiber cable as claimed in claim 13, wherein each cushion member has an elasticity stiffness which varies across the thickness of the cushion member.

20. The optical fiber cable as claimed in claim 13, wherein the cushion members are disposed over edges of the optical fiber ribbon stack.

21. The optical fiber cable as claimed in claim 13, wherein an outer surface of each cushion member has a contact hardness and a Young's modulus which are approximately the same as the contact hard hardness and Young's modulus of a matrix material which holds the optical fibers of the optical fiber ribbon stack together in the planar array.

22. The optical fiber cable as claimed in claim 13, wherein the cushion members have a graded contact hardness or Young's modulus which changes from sides of the cushion members which contact the ribbon stack towards sides of the cushion members which face away from the ribbon stack.

23. The optical fiber cable as claimed in claim 14, wherein the cushion members have a graded Young's modulus or contact hardness which changes from the Young's modulus or contact hardness of the ribbon stack towards the Young's modulus and contact hardness of the buffer tube.

24. The optical fiber cable as claimed in claim 13, wherein the cushion members are centered on the side surfaces of the ribbon stack.

25. The optical fiber cable as claimed in claim 13, wherein the cushion members are twisted together with the ribbon stack.

26. The optical fiber cable as claimed in claim 13, wherein a cross-sectional shape of each cushion member is a hollow tube, a rectangle, a trapezoid, or a circle.

27. The optical fiber cable as claimed in claim 26, wherein the cushion members are disposed over corner edges of the ribbon stack.

28. The optical fiber cable as claimed in claim 26, wherein the cushion members are centered on the outer side surfaces of the ribbon stack.

29. The optical fiber cable as claimed in claim 26, wherein a contact hardness of each cushion member on a side of the cushion member which contacts the optical fiber ribbon stack is a softer than a contact hardness of the cushion member on a side of the cushion member which faces the buffer tube.

* * * * *